(12) United States Patent
Janik et al.

(10) Patent No.: US 9,628,545 B2
(45) Date of Patent: Apr. 18, 2017

(54) SYSTEM AND METHOD FOR USING A WEBPAD TO CONTROL A DATA STREAM (75) Inventors: Craig M. Janik, Los Altos Hills, CA (US); Nick Kalayjian, San Francisco, CA (US); Bruce Edwards, Burlingame, CA (US); Josh Ferguson, San Francisco, CA (US)

(73) Assignee: CALLAHAN CELLULAR L.L.C., Wilmington, DE (US)

( * ) Notice: Subject to any disclaimer, the term of this patent is extended or adjusted under 35 U.S.C. 154(b) by 587 days.

(21) Appl. No.: 13/286,476

(22) Filed: Nov. 1, 2011

(65) Prior Publication Data

US 2012/0047536 A1 Feb. 23, 2012

Related U.S. Application Data (63) Continuation of application No. 13/031,381, filed on Feb. 21, 2011, now Pat. No. 8,078,751, which is a (Continued)

(51) Int. Cl.
*H04N 7/16* (2011.01)
*H04N 7/18* (2006.01)
(Continued)

(52) U.S. Cl.
CPC .......... *H04L 67/025* (2013.01); *G06F 1/1632* (2013.01); *H04H 20/57* (2013.01); *H04H 20/71* (2013.01); *H04H 60/88* (2013.01); *H04H 60/90* (2013.01); *H04H 60/91* (2013.01); *H04L 12/282* (2013.01); *H04L 12/2805* (2013.01); *H04L 67/00* (2013.01); *H04L 67/04* (2013.01); *H04N 5/4401* (2013.01); *H04N 7/17318* (2013.01); *H04N 21/41407* (2013.01);
(Continued)

(58) Field of Classification Search
CPC .............................. H04H 20/57; H04H 20/71
See application file for complete search history.

(56) References Cited

U.S. PATENT DOCUMENTS 5,434,860 A 7/1995 Riddle
5,488,572 A 1/1996 Belmont
(Continued)

FOREIGN PATENT DOCUMENTS

EP 0 945 818 9/1999
EP 0 992 921 4/2000
(Continued)

OTHER PUBLICATIONS

International Preliminary Examination Report for PCT/US01/42050 completed Dec. 2, 2002.
(Continued)

*Primary Examiner* — Jonathan V Lewis (57) ABSTRACT

A system and method for using a webpad to select a target device which is to receive from a source device a stream of a digital representation of a media. The webpad is used to send a transmission to the source device to cause the source device to route the stream of the digital representation of the media to the target device where the target device decodes and converts the digital representation of the media into analog signals to thereby allow for a reproduction of the media.

29 Claims, 9 Drawing Sheets

Related U.S. Application Data continuation of application No. 11/113,529, filed on Apr. 25, 2005, now Pat. No. 7,904,579, which is a continuation of application No. 09/955,723, filed on Sep. 18, 2001, now abandoned.

(60) Provisional application No. 60/233,839, filed on Sep. 19, 2000.

(51) Int. Cl.
    *H04L 29/08* (2006.01)
    *H04N 21/414* (2011.01)
    *H04N 5/44* (2011.01)
    *H04H 60/90* (2008.01)
    *H04N 21/436* (2011.01)
    *H04N 7/173* (2011.01)
    *H04N 21/61* (2011.01)
    *H04H 20/71* (2008.01)
    *H04H 60/88* (2008.01)
    *H04H 20/57* (2008.01)
    *H04H 60/91* (2008.01)
    *H04N 21/4363* (2011.01)
    *G06F 1/16* (2006.01)
    *H04L 12/28* (2006.01)
    *H04W 4/00* (2009.01)

(52) U.S. Cl.
    CPC .. *H04N 21/43615* (2013.01); *H04N 21/43637* (2013.01); *H04N 21/6131* (2013.01); *H04W 4/00* (2013.01)

(56) References Cited

U.S. PATENT DOCUMENTS

| | | | |
|---|---|---|---|
| 5,526,035 A * | 6/1996 | Lappington et al. | 725/136 |
| 5,606,594 A | 2/1997 | Register et al. | |
| 5,644,471 A | 7/1997 | Schultz et al. | |
| 5,721,827 A | 2/1998 | Logan et al. | |
| 5,724,567 A | 3/1998 | Rose et al. | |
| 5,739,665 A | 4/1998 | Bares | |
| 5,742,599 A | 4/1998 | Lin et al. | |
| 5,758,257 A | 5/1998 | Herz et al. | |
| 5,768,100 A | 6/1998 | Barrus et al. | |
| 5,790,935 A | 8/1998 | Payton | |
| 5,793,980 A | 8/1998 | Glaser et al. | |
| 5,822,546 A | 10/1998 | George | |
| 5,831,664 A * | 11/1998 | Wharton et al. | 725/81 |
| 5,882,220 A | 3/1999 | Horii et al. | |
| 5,884,028 A | 3/1999 | Kindell et al. | |
| 5,886,732 A * | 3/1999 | Humpleman | 725/49 |
| 5,889,506 A | 3/1999 | Lopresti et al. | |
| 5,890,016 A | 3/1999 | Tso | |
| 5,905,523 A | 5/1999 | Woodfield et al. | |
| 5,926,624 A | 7/1999 | Katz et al. | |
| 5,946,637 A | 8/1999 | Umbach et al. | |
| 5,991,306 A | 11/1999 | Burns et al. | |
| 6,005,566 A | 12/1999 | Jones et al. | |
| 6,041,068 A * | 3/2000 | Rosengren | G06T 9/007 348/423.1 |
| 6,065,880 A * | 5/2000 | Thompson | 385/88 |
| 6,115,248 A | 9/2000 | Canova et al. | |
| 6,118,442 A * | 9/2000 | Tanigawa | 715/719 |
| 6,118,450 A | 9/2000 | Proehl et al. | |
| 6,122,526 A * | 9/2000 | Parulski et al. | 455/556.1 |
| 6,127,941 A | 10/2000 | Van Ryzin | |
| 6,154,771 A * | 11/2000 | Rangan | H04N 5/76 345/660 |
| 6,243,581 B1 | 6/2001 | Jawanda | |
| 6,263,503 B1 | 7/2001 | Margulis | |
| 6,265,845 B1 | 7/2001 | Bo et al. | |
| 6,266,539 B1 | 7/2001 | Pardo | |
| 6,282,238 B1 | 8/2001 | Landry | |
| 6,349,410 B1 * | 2/2002 | Lortz | 725/110 |
| 6,351,467 B1 | 2/2002 | Dillon | |
| 6,353,930 B1 * | 3/2002 | Shimoji | H04H 20/93 348/E5.108 |
| 6,356,539 B1 * | 3/2002 | Zuliani et al. | 370/320 |
| 6,377,825 B1 | 4/2002 | Kennedy et al. | |
| 6,424,369 B1 | 7/2002 | Adair et al. | |
| 6,434,403 B1 | 8/2002 | Ausems et al. | |
| 6,434,747 B1 | 8/2002 | Khoo et al. | |
| 6,453,355 B1 | 9/2002 | Jones et al. | |
| 6,484,212 B1 | 11/2002 | Markowitz et al. | |
| 6,510,553 B1 | 1/2003 | Hazra | |
| 6,516,202 B1 | 2/2003 | Hawkins et al. | |
| 6,518,902 B2 | 2/2003 | Panasik et al. | |
| 6,526,581 B1 | 2/2003 | Edson | |
| 6,542,721 B2 | 4/2003 | Boesen | |
| 6,557,756 B1 | 5/2003 | Smith | |
| 6,577,849 B1 | 6/2003 | Eaton et al. | |
| 6,581,103 B1 | 6/2003 | Dengler | |
| 6,597,924 B1 | 7/2003 | Smith | |
| 6,633,482 B2 | 10/2003 | Rode | |
| 6,657,654 B2 | 12/2003 | Narayanaswami | |
| 6,662,231 B1 | 12/2003 | Drosset et al. | |
| 6,678,215 B1 | 1/2004 | Treyz et al. | |
| 6,678,536 B2 | 1/2004 | Fletcher et al. | |
| 6,678,737 B1 | 1/2004 | Bucher | |
| 6,700,893 B1 | 3/2004 | Radha et al. | |
| 6,708,213 B1 | 3/2004 | Bommaiah et al. | |
| 6,708,217 B1 | 3/2004 | Colson et al. | |
| 6,717,952 B2 | 4/2004 | Jones et al. | |
| 6,744,763 B1 | 6/2004 | Jones et al. | |
| 6,826,283 B1 | 11/2004 | Wheeler et al. | |
| 6,829,648 B1 | 12/2004 | Jones et al. | |
| 6,832,288 B2 | 12/2004 | Ohta et al. | |
| 6,832,388 B1 | 12/2004 | Du Val | |
| 6,834,308 B1 | 12/2004 | Ikezoye et al. | |
| 6,941,575 B2 | 9/2005 | Allen | |
| 6,961,713 B2 * | 11/2005 | Perkowski | G07F 17/16 705/26.62 |
| 6,968,364 B1 * | 11/2005 | Wong et al. | 709/217 |
| 7,024,466 B2 | 4/2006 | Outten et al. | |
| 7,039,643 B2 | 5/2006 | Sena et al. | |
| 7,080,152 B2 | 7/2006 | Bodin et al. | |
| 7,117,516 B2 | 10/2006 | Khoo et al. | |
| 7,139,813 B1 * | 11/2006 | Wallenius | 709/219 |
| 7,191,242 B1 | 3/2007 | Serenyi et al. | |
| 7,200,683 B1 * | 4/2007 | Wang et al. | 709/250 |
| 7,333,957 B2 * | 2/2008 | Levy | G06F 17/30017 704/E15.045 |
| 7,366,788 B2 | 4/2008 | Jones et al. | |
| 7,506,356 B2 * | 3/2009 | Gupta | G06F 17/241 725/116 |
| 7,631,088 B2 | 12/2009 | Logan et al. | |
| 7,725,912 B2 * | 5/2010 | Margulis | H04L 12/2812 725/80 |
| 7,849,393 B1 * | 12/2010 | Hendricks | H04N 5/4401 715/203 |
| 7,904,579 B2 * | 3/2011 | Janik | G06F 1/1632 709/219 |
| 8,082,572 B1 * | 12/2011 | Tilford | 725/133 |
| 8,214,422 B1 | 7/2012 | Woodward et al. | |
| 2001/0013123 A1 * | 8/2001 | Freeman et al. | 725/34 |
| 2002/0044225 A1 * | 4/2002 | Rakib | 348/734 |
| 2002/0049975 A1 * | 4/2002 | Thomas et al. | 725/60 |
| 2002/0056112 A1 | 5/2002 | Dureau et al. | |
| 2002/0056114 A1 * | 5/2002 | Fillebrown et al. | 725/78 |
| 2002/0068558 A1 * | 6/2002 | Janik | 455/422 |
| 2002/0091697 A1 * | 7/2002 | Huang et al. | 707/10 |
| 2002/0116707 A1 | 8/2002 | Morris et al. | |
| 2002/0124097 A1 | 9/2002 | Isely et al. | |
| 2003/0088878 A1 * | 5/2003 | Rogers et al. | 725/109 |
| 2003/0097338 A1 * | 5/2003 | Mankovich et al. | 705/64 |

(56) References Cited

U.S. PATENT DOCUMENTS

2008/0189740 A1* 8/2008 Carpenter et al. .............. 725/38
2009/0031419 A1 1/2009 Laksono

FOREIGN PATENT DOCUMENTS

| | | |
|---|---|---|
| EP | 0 909 112 | 1/2004 |
| GB | 2 312 591 | 10/1997 |
| WO | WO-99/18506 | 4/1999 |
| WO | WO-99/65209 | 12/1999 |
| WO | WO-00/23899 | 4/2000 |
| WO | WO-00/36757 | 6/2000 |
| WO | WO-00/42050 | 7/2000 |
| WO | WO-00/43905 | 7/2000 |
| WO | WO-00/49731 | 8/2000 |
| WO | WO-01/10124 | 2/2001 |
| WO | WO-01/47192 | 6/2001 |
| WO | WO-02/21248 | 3/2002 |

OTHER PUBLICATIONS

International Preliminary Examination Report for PCT/US02/27598 completed Dec. 19, 2002.
International Search Report for PCT/US01/27598 dated Sep. 5, 2001.
International Search Report for PCT/US01/42050 completed Dec. 11, 2001.
Final Office Action on U.S. Appl. No. 11/113,571, mailed May 29, 2007.
Final Office Action on U.S. Appl. No. 11/113,529, mailed Nov. 23, 2007.
Final Office Action on U.S. Appl. No. 11/113,529, mailed May 29, 2007.
G. Degoulet et al., EPEOS—Automatice Program Recording System, Nov. 1975, 22 pgs.
IBM Technical Disclosure Bulletin, "Modular Docking Station," IBM Corp.,vol. 34, No. 2, pp. 354-355.
International Search Report for PCT/US01/29348 mailed Jul. 2, 2002.
National Semiconductor, "The Age of Information Access," Online Jun. 12, 1999, XP002202547, Retrieved from the Internet on Jun. 18, 2002, <URL:http://aldebaran.elo.utfsm.cl/datasheet/national/htm/nsc00958.htm>.
National Semiconductor, "WebPad-Portable Web Access (datasheet)", Online Jul. 22, 1999, XP002202548, Retrieved from the Internet on Jun. 18, 2002, <URL: http://aldebaran.elo.utfsm.cl/datasheet/national/pdf/nsc04795.pdf>.
Non-final Office Action for U.S. Appl. No. 09/946,946, mailed Oct. 6, 2004.
Non-final Office Action for U.S. Appl. No. 10/125,025, mailed Jan. 25, 2005.
Non-Final Office Action on U.S. Appl. No. 11/113,571, mailed Aug. 1, 2011.
Non-Final Office Action on U.S. Appl. No. 11/113,529, mailed Feb. 21, 2007.
Non-Final Office Action on U.S. Appl. No. 11/113,529, mailed Sep. 4, 2007.
Non-final Office Action on U.S. Appl. No. 11/113,571, mailed Feb. 21, 2007.
Non-final Office Action on U.S. Appl. No. 11/169,354, mailed Feb. 12, 2008.
Non-Final Office Action on U.S. Appl. No. 11/169,354, mailed Nov. 26, 2008.
Notice of Allowance for U.S. Appl. No. 11/169,354, mailed Sep. 18, 2009.
Notice of Allowance on U.S. Appl. No. 11/113,529, mailed Nov. 3, 2010.
Notice of Allowance on U.S. Appl. No. 11/113,571, mailed Apr. 29, 2011.
Notice of Allowance on U.S. Appl. No. 13/031,381, mailed Aug. 8, 2011.
PR Newswire, New Company Xenote Allows Consumers to 'Bookmark the Real World' with Fun, Personal Internet Device, Jan. 25, 2000, 2 pgs.
Sheng, S. et al., "A Portable Multimedia Terminal," IEEE Communications Magazine, IEEE Service Center, Piscataway, New York, USA, vol. 30, No. 12, Dec. 1, 1992, pp. 64-75, XP000330091, ISSN: 0163-6804.
Tivo, Inc., Form S-1, Jul. 22, 1999, 902 pgs.
Truman, T.E. et al., "The InfoPad Multimedia Terminal: A Portable Device for Wireless Information Access," IEEE Transactions on Computers, IEEE Inc., New York, USA, vol. 47, No. 10, Oct. 1, 1998, pp. 1073-1087, XP000781992, ISSN: 0018-9340.
Takuya Ima-ide et al., "Network MPEG Video Distribution System," Hitachi Review vol. 49, No. 1, 2000, pp. 11-15.

* cited by examiner

SYSTEM AND METHOD FOR USING A WEBPAD TO CONTROL A DATA STREAM

CROSS-REFERENCE TO RELATED PATENT APPLICATIONS

The present application is a Continuation of U.S. patent application Ser. No. 13/031,381, filed Feb. 21, 2011, which is a Continuation of U.S. patent application Ser. No. 11/113,529, filed Apr. 25, 2005, which is a Continuation of U.S. patent application Ser. No. 09/955,723, filed Sep. 18, 2001, which claims the benefit of U.S. Provisional Patent Application No. 60/233,839, filed Sep. 19, 2000, each of which is hereby incorporated by reference in its entirety.

BACKGROUND

The rapid buildup of telecommunications infrastructure combined with substantial investment in Internet-based businesses and technology has brought Internet connectivity to a large segment of the population. Recent market statistics show that a majority of households in the U.S. own at least one personal computer (PC), and a significant number of these PCs are connected to the Internet. Although the majority of household PCs are connected to the Internet by dialup modem connections, broadband connectivity is being rapidly adopted, and is decreasing in price as a variety of technologies are introduced and compete in the marketplace. A large majority of households in the U.S. and Europe are viable for at least one or more type of broadband connection, such as cable, DSL, optical networks, fixed wireless, or two-way satellite transmission.

The rapid proliferation of low-cost processing power and Internet connectivity has driven the availability and popularity of digital content. Digitization combined with compression technology produces content that is small and portable. Consumer enthusiasm for digital audio files such as MP3-formatted content is a prime example of the trend toward content digitization, enabling consumers to efficiently share audio files that they have digitized from CDs. The creation and transfer of digital audio is now understood and desired by millions of consumers. The MP3 digital audio format is an audio encoding technology that allows consumers to further compress digital audio files such as those found on Compact Disks, to much smaller sizes with very little decrease in sound quality. PC-based MP3 software players have been created that provide a convenient graphical user interface and software decoding of MP3 files. Some technology allows users to play MP3 files on their PC, using an existing sound card with external speakers. However, to listen to MP3s the user must interface with the PC, using a mouse and keyboard, and must be nearby the PC sound output equipment.

Other content mediums are trending toward digitization. The processing and sharing of digital images is expected to increase geometrically as digital cameras gradually replace conventional film chemistry. Electronic texts (eBooks) are another example of how digitization enables more efficient and varied transfer of content. As system bandwidth increases, it is only a matter of time before digital video transport is as common as audio is now. Additionally, interactive multimedia (Flash and Shockwave) will increasingly be made available to end users with PCs.

A market for home networking technology has emerged, driven by the need to share an Internet connection between two or more PCs, and to connect all the PCs to productivity peripherals. There has been innovation in local area network (LAN) technology based on end-user desire for simplicity and ease of installation. The Home Phoneline Networking Association (HPNA) promotes networking products that turn existing phone wiring in the home into an Ethernet physical layer. Existing HPNA products provide data-rates equivalent to 10 base-T Ethernet, approximately 10 Mbps. Networking technology that uses the AC power wiring in the home to carry data signals has also appeared. Similar to HPNA devices, adapters are required to convert data signals from devices into voltage fluctuations carried on to and off of the AC wires, allowing any AC outlet to become a network interface.

Wireless radio-frequency (RF) LAN technology has also been introduced into the home networking market. Theoretically, wireless technology is the most convenient for the end user to install. Two prevalent standards for wireless networking are Institute of Electrical and Electronics Engineers (IEEE) 802.11b and HomeRF. Both of these systems utilize the unlicensed 2.4 Ghz ISM band as the carrier frequency for the transmission of data. Both of these technologies have effective ranges of approximately 150 feet in a typical household setting. In addition to utilizing Transmission Control Protocol/Internet Protocol (TCP/IP) protocols, IEEE 802.11b and HomeRF include additional encryption and security protocol layers so that the user's devices have controlled access to data being sent through the LAN.

Although there is a significant installed base of PCs with access to large volumes of digital content via Internet connectivity, the value of that content is limited when it can only be experienced at the PC.

Portable digital audio playback devices have been developed that are significantly smaller than portable CD players because they contain no moving parts, only flash memory, a microprocessor for decoding MP3 compressed audio content, and batteries. However, the cost per bit of audio content with portable digital audio playback devices is still very high because of the high cost of flash memory. The typical portable digital audio playback device includes enough flash memory to store about one CD's worth of digital music. The result is that the user is burdened with having to continually manually change the music files in the device by plugging the device into the PC and operating a user interface, if they want to listen to a wide range of music.

PDAs and other portable handheld computers have achieved widespread market acceptance due to the valuable data manipulation, access, and storage functionality available in conveniently portable form factors. The innovation of pen-based user interfaces in combination with various types of character recognition technology has also been a factor in the high adoption rate of PDAs. The Palm Pilot® in particular has advanced the state of the art of handheld computing by offering a small, light form factor with an effective character recognition application called Graffiti®. The Palm Pilot® uses the PalmOS® operating system. The Palm Pilot® is manufactured by Palm Computing, Inc. Other small form factor PDAs are available, such as the iPaq®, manufactured by Compaq Computer, Inc. Casio, Inc. offers the Cassiopeia®.

What is required is a system that allows a user to access all of the digital content and information services without being forced to sit at a PC.

SUMMARY

A webpad and method for using the same are provided. In one embodiment, information is determined about primary content being played on an audiovisual device using a computer system. Ancillary data is obtained relating to the primary content based on the information about the primary content. The ancillary data is automatically sent to the webpad for access therefrom as the primary content is being played on the audiovisual device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A webpad and method for using the same are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

A set of definitions is provided below.

DEFINITIONS

Personal Digital Assistants (hereafter PDAs) are defined as the category of computers that are small enough to be comfortably held in one hand, and that contain software applications that are used for personal organization, productivity, and communication. The PDA category includes handheld computers, including single-housing devices such as the Palm Pilot, which have a two-piece clam-shell plastic housing with an integral display. PDAs of this variety include an LCD that allows the user to write on it with a stylus, or otherwise control and manipulate the software and stored content on the PDA. There are also hinged designs for PDAs that are similar in configuration, although much smaller than, portable notebook computers. In this configuration, one housing contains the microprocessor, memory, batteries, and small keyboard, and the other housing contains an LCD.

A network is one or more computer devices of any type, such as a personal computer (PC), network appliance, or PDA, connected together by a data transfer link. A PDA that has a communication link to the Internet is often referred to as a node. A node (point of interaction with the Internet) on the network can potentially communicate, i.e., send or receive data to any other node (electronic device) on the network. Networks may be physically wired or they may be wireless.

The Internet is used interchangeably with the term web or worldwide web. Both of these are defined as the worldwide network of PCs, servers, and other devices.

A CCD (charged coupled device) is a semiconductor technology used to build light-sensitive electronic devices such as cameras. Each CCD chip consists of an array of light sensitive photocells that, in conjunction with a lens, can be used to capture both still shots and moving pictures. CCD technology is well known in the field of digital image acquisition and will not be described in detail here for reasons of brevity.

Broadband connection is defined as a communications network in which the frequency bandwidth can be divided and shared by multiple simultaneous signals. A broadband connection to the Internet typically provides minimum upstream and downstream data-rates of approximately 200K or more bits per second. There are many different types of broadband connections including DSL, cable modems, and fixed and mobile wireless connections.

A Data Over Cable System Interface Specification (DOCSIS) modem is an industry standard type of cable modem that is used to provide broadband access to the Internet over a coaxial cable physical layer that is also used for the delivery of cable TV signals (CATV). DOCSIS modems are well known in the telecommunications industry and will not be described here in detail.

A Digital Subscriber Line (DSL) modem is also an industry standard type of modem that is used to provide broadband access to the Internet, but over conventional copper phone lines (local loops). DSL modems are well known in the telecommunications industry and will not be described here in further detail.

The term gateway, used interchangeably with broadband gateway, is defined as an integral modem and router, and may include hub functionality. The modem function is used to change voltage fluctuations on an input carrier line (a DSL line input or a cable TV input) into digital data.

Routers are devices that connect one distinct network to another by passing only certain IP addresses that are targeted for specific networks. Hubs allow one network signal input to be split and thus sent to many devices.

Gateway storage peripheral is defined as an add-on storage device with processing power, an operating system, and a software application that manages the downloading and storage of data. An example scenario for the use of a gateway storage peripheral is a system where a user has a DOCSIS modem and would like to add an always-on storage capability. The gateway storage peripheral is connected to the DOCSIS modem via a USB port or an Ethernet port in the DOCSIS modem. A gateway storage peripheral in combination with a DOCSIS modem or any type of broadband modem is considered a storage gateway system. A PC that is always left on and connected to an always-on gateway with a DSL or broadband cable connection is considered a storage gateway system.

The term "message" is defined as information that is sent digitally from one computing device to another for various purposes. The term "content" is used to mean the information contained in digital files or streams. For example, content may be entertainment or news, or audio files in MP3 format. "Data" is used to mean information such as digital schedule contents, responses from devices sent back through the system, or digital messages and email. "Content" and "data" are sometimes used interchangeably. "Client devices" are those devices that are not fully functional without a host device such as a personal computer.

Local Area Network (LAN) is defined as a network structure that includes two or more devices that can communicate with other devices utilizing a shared communication infrastructure, including wired network technologies, such as Ethernet, or wireless network technologies such as Institute of Electrical and Electronics Engineers (IEEE) 802.11b or HomeRF technology. Wireless LAN technology such as IEEE 802.11b and HomeRF are based on the unlicensed 2.4 Ghz ISM (Industrial, Scientific, and Medical) frequency band. These networking technologies utilize Transmission Control Protocol/Internet Protocols (TCP/IP) protocols.

A LAN typically constitutes a group of interconnected devices that share a common geographic location and are typically grouped together as a subnet. A local network, for example, would be a home network where several computers and other smart devices would be digitally connected for the purpose of transferring content and data, controlling each other, sharing programming, or presenting data and content to a user.

CODEC (Compression/Decompression algorithm) is a software application that is used to decode (uncompress) encoded (compressed) media files or streams. Most content is stored and sent in a compressed format so that the content files are smaller and thus take up less storage space and use less bandwidth when being transferred via the Internet. The content is then decoded at the playback device. For example, MP3 audio files are encoded and must be decoded by a microprocessor running the codec in order for the audio content to be presented to the user in an analog format.

HTTP is Hyper-text transfer protocol, the protocol used by Web browsers and Web servers to transfer files, such as text and graphic files. Data-rate is defined as the data throughput of a telecommunications system or technology, and is measured in a quantity of bits per second, such as millions of bits per second (Mbps).

Overview of Operation

Figure 1:
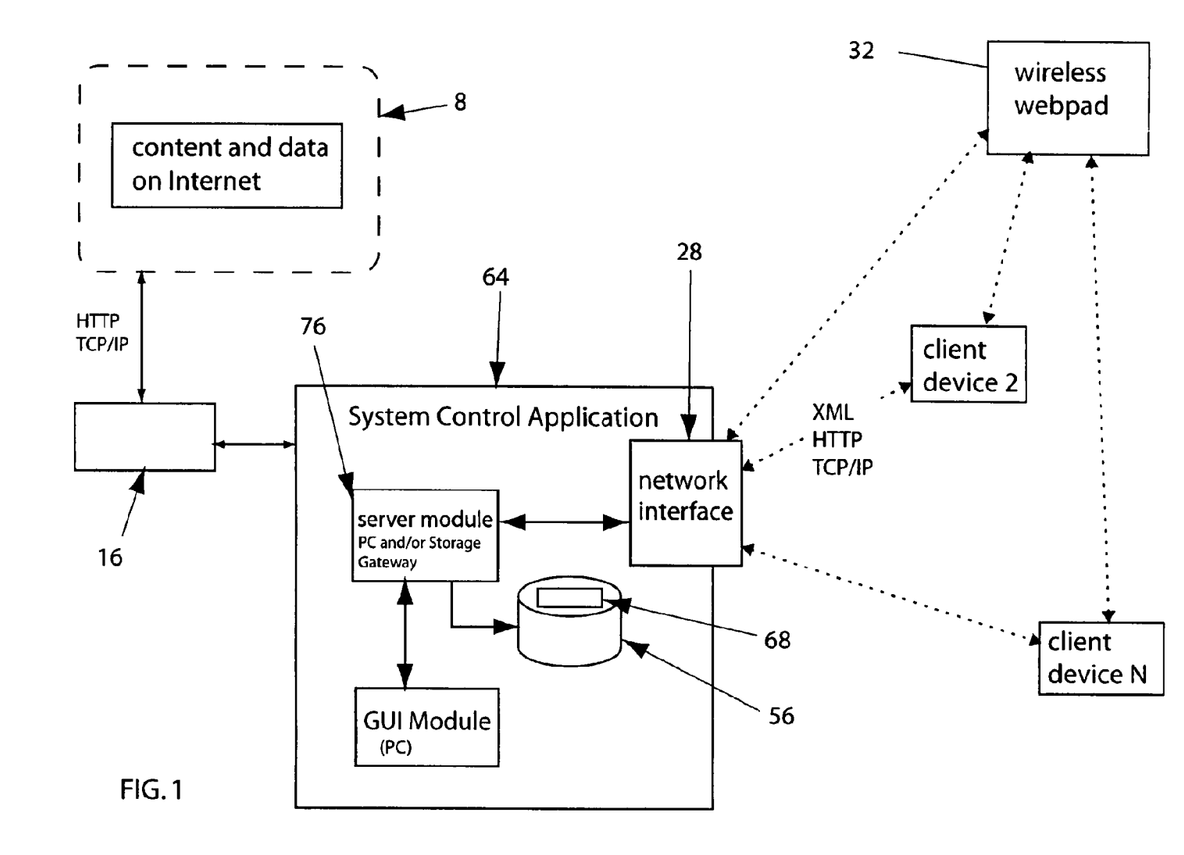
FIG. 1 shows a schematic of one embodiment of the wireless webpad system.

Referring now to FIG. 1, the fundamental operation of the wireless webpad 32 system involves LAN transmission of digital content and services from a local server that is a PC in one embodiment. Content and communication services are received via PC but can originate on the Internet 8, using the PC as a proxy server. Wireless webpad 32 receives the digital content and communications and processes it in various ways.

Figure 2:
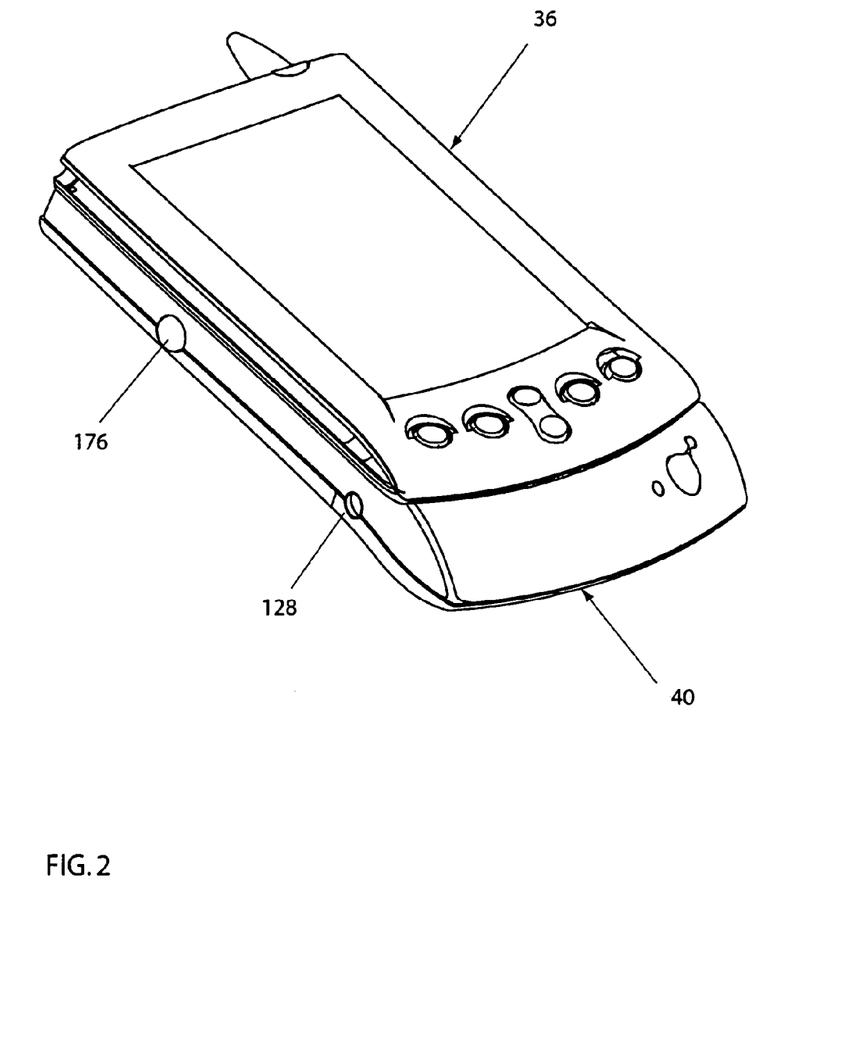
FIG. 2 shows an isometric view of one embodiment of a webpad that is a PDA attached to a wireless LAN adapter.

In one embodiment, webpad 32, shown in FIG. 2, is a PalmV PDA 36 manufactured by Palm Computing. The PDA 36 is attached to a wireless LAN adapter 40. The PC is also functionally connected via a USB connection to a wireless radio frequency (RF) LAN access point 28, such that digital content from PC is transmitted to nodes on the LAN 48.

The Function of the PC and Broadband Connection in the System

In one embodiment, the function of PC in the wireless webpad 32 system is to acquire, store, manage, and serve digital content and interactive services to wireless webpad 32. Digital content is stored on PC hard disk drive 56. PC gains access to digital audio and video content several ways. In one embodiment PC is also connected to Internet 8 via a broadband cable modem 16. Thus PC has access via content services to downloadable digital audio files such as MP3 formatted audio files, MPEG-2 and MPEG-4 video files, as well as digital audio and video streams from Internet 8 servers.

In one embodiment, the user can also manually convert CD audio files into MP3 files, a process known as "ripping". PC can also route Internet 8 streams of content to webpad 32. In other embodiments, PC is connected to Internet 8 through a dial-up modem connection to an ISP, or Digital Subscriber Line (DSL), or a fixed wireless broadband connection.

Discussion of Wireless LAN Adapter 40—Mechanical Description

Figure 3:
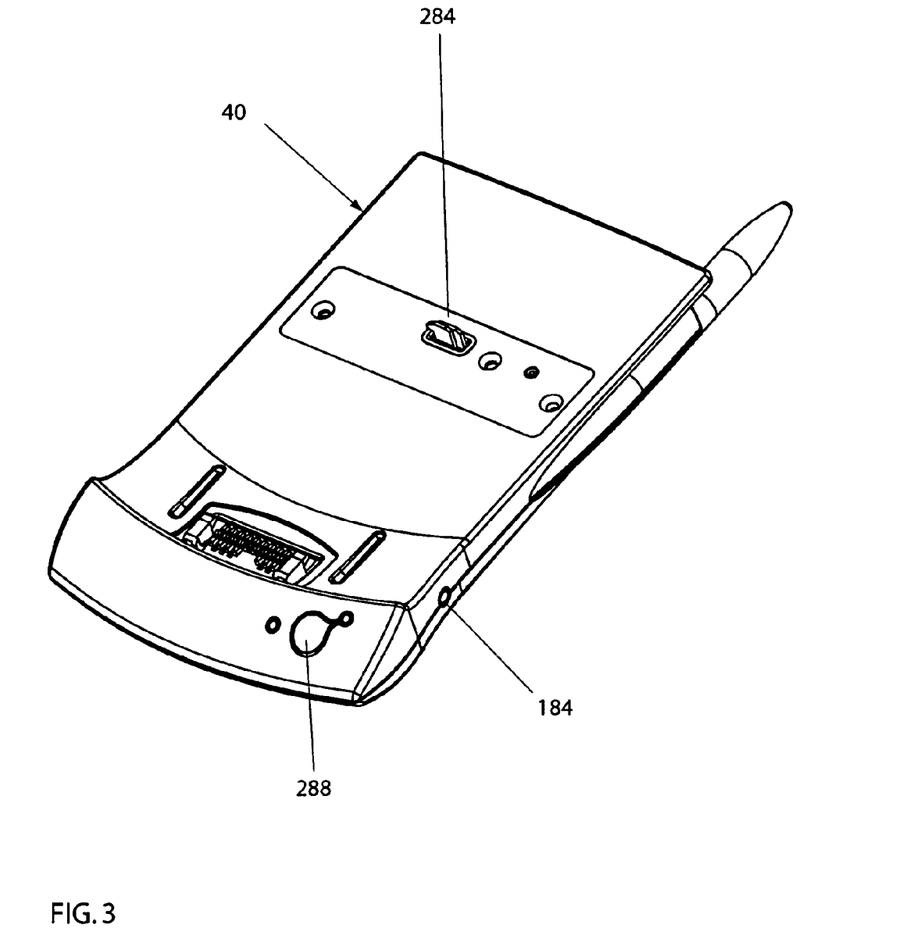
FIG. 3 shows an isometric view of one embodiment of a wireless LAN adapter.

As shown in FIG. 2, PDA 36 docks with wireless LAN adapter 40 with a spring loaded mechanical attachment that includes a latch hook 284. The latch hook 284 is shown in FIG. 3. In one example where the PDA 36 is a Palm, and Palm Computing provides a reference design for connecting to the Palm V with the use of a small slot on the bottom side of the Palm V housing. PDA 36 is released from wireless LAN adapter 40 by pressing button 176. Electrical contacts on the rear end of PDA 36 make contact with electrical contacts on wireless LAN adapter 40 in order to establish a data communication link.

FIG. 3 shows wireless LAN adapter 40 without PDA 36 attached. In one embodiment, the lower part of wireless LAN adapter 40 has the same shape as the lower part of PDA 36, and includes the same electrical contacts as PDA 36 electrical contacts in order to fit in to and utilize the existing PDA 36 docking cradle. By placing PDA 36 attached to wireless LAN adapter 40 into PDA 36 docking cradle, both the PDA 36 battery and the battery 104 included in wireless LAN adapter 40 are alternatively charged.

Figure 4:
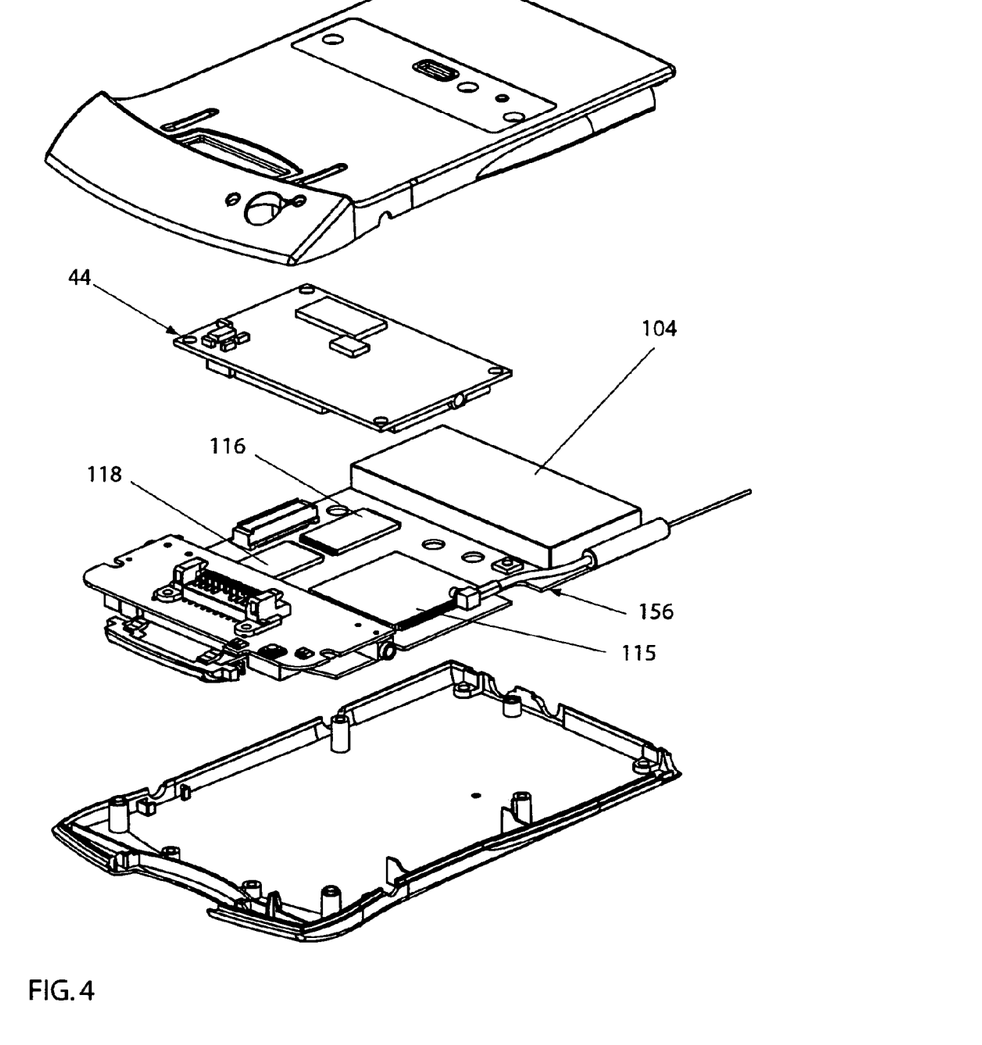
FIG. 4 shows an exploded view of one embodiment of a wireless LAN adapter.

Referring now to FIG. 4, an exploded view of wireless LAN adapter 40 shows a typical two-piece plastic shell construction as well as other components. Internal hardware components include a motherboard 156 that contains the electronic components that constitute the functional data-manipulating aspect of the device.

Electrical Description

Figure 5:
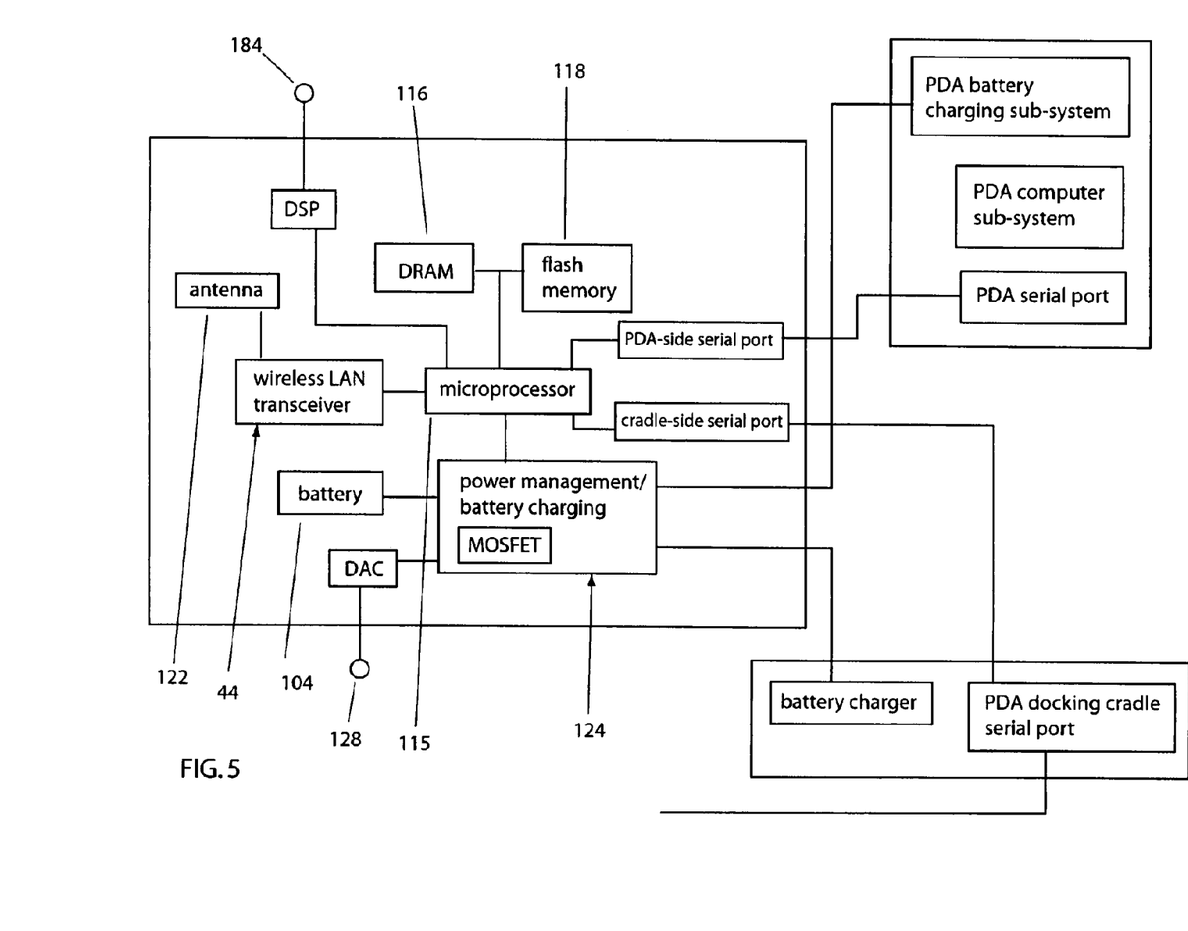
FIG. 5 is a block diagram of one embodiment of the electronic components in the wireless LAN adapter.

FIG. 5 shows a block diagram of the electrical components in wireless LAN adapter 40. Motherboard 156 electrically connects components including a microprocessor 115, dynamic memory (DRAM) 116, programmable (flash) memory 118, a power regulation and battery charging subsystem 124, a digital signal processor (DSP), battery 104, a headset jack 184, and a stereo audio out jack 128. A wireless LAN transceiver 44 is functionally connected to motherboard 156.

In one embodiment, wireless LAN adapter 40 also includes a digital-to-analog converter (DAC) for converting the uncompressed digital information into analog signals that are presented at the stereo audio out jack 128. Microprocessor 115 in combination with DRAM memory 116 executes instructions from the real time operating system 92 and control firmware 96. In an alternative embodiment, wireless LAN adapter 40 includes a charge-coupled device (CCD) chip and a lens, the function of which will be explained later in this disclosure.

Description of Wireless LAN Transceivers (Card in LAN Adapter)

Wireless LAN transceivers 44 are capable of sending and receiving data using radio frequencies via a wireless data transfer protocol. Technology for such a LAN is currently available and includes the Symphony wireless networking access point provided by Proxim, Inc. LAN systems such as this are based on RF modulation centered on the 2.4 GHz frequency band. Such LANs have a practical range of approximately 150 feet and are capable of reaching most areas in an average sized house were webpad 32 might be located.

In another embodiment, the wireless LAN access point 28 is a PCI card that is located internal to the PC, with an external antenna 122. In another embodiment, the wireless LAN communication link is provided using IEEE 802.11b protocols. In another embodiment wireless LAN communication link is provided using Bluetooth protocols.

Wireless Webpad Software and Functionality

Figure 6:
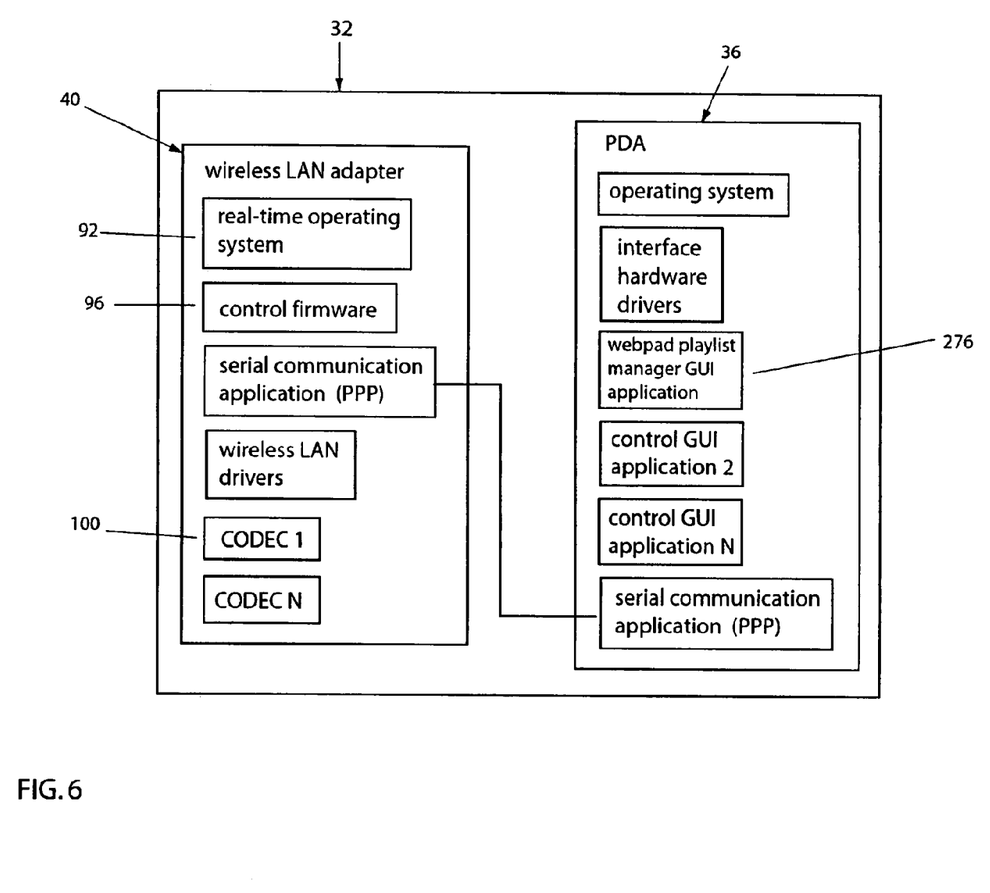
FIG. 6 is a block diagram of one embodiment of the software components in the wireless webpad.

Wireless webpad 32 functions are the combined functions of PDA 36 and wireless LAN adapter 40. FIG. 6 is a block diagram of the location of various software functions in wireless webpad 32. PDA 36 is used primarily for its user-interface capabilities. Many functions require the computer processing power of wireless webpad 32. For example, microprocessor 115 in combination with DAC and CODEC 100 in wireless LAN adapter 40 is capable of decoding digital audio files. Microprocessor 115 in combination with DSP and a microphone input is capable of digitizing sound inputs.

Device Software—CODECs

In one embodiment, wireless LAN adapter 40 includes the Fraunhofer CODEC in wireless LAN adapter 40, licensed for use by Thomson Electronics for decoding the digital audio file that is streamed to it from PC. CODEC 100 is an executable file stored in memory, launched by control firmware 96, executed by real time operating system 92 running on wireless LAN adapter 40. Wireless LAN adapter 40 may store a multiple CODECs in memory 118 in wireless LAN adapter 40 for decoding variously formatted digital audio files that may be selected by the user. For example, the WindowsMedia CODEC, provided by Microsoft may be stored in memory 118 at wireless webpad 32.

Software Module—System Control Application 64

FIG. 1 lists the software components of wireless webpad 32 system that are included at PC. FIG. 6 lists the software elements of wireless LAN adapter 40 and PDA 36.

The system control application 64 is software executing on PC that manages communication and streaming from PC to wireless webpad 32. System control application 64 includes a server module 76 that is a Java application. System control application 64 also includes a database module 68 that is written to or accessed by server module 76, and a series of graphical user interface (GUI) modules, that provide user interfaces for setting up content to be accessed by or streamed to wireless webpad 32, as well as other devices on the LAN. One instance of GUI module is a Windows application that runs on PC. Another instance of GUI module is a native application for PDA 36 operating system.

An example of webpad 32 GUI is the webpad playlist manager GUI application 276 that features a three-level nested list structure for organizing digital audio content. The three levels are labeled as channels, playlists, and tracks. Channels are lists of playlists, and playlists are lists of tracks. Track is a GUI representation of a locally cached digital audio file or a digital audio stream from Internet 8. Audio content services are also available through online services accessed through a browser interface on webpad 32. The online digital audio files associated with online playlist titles in the online playlists are streamed to wireless webpad 32 via PC and wireless LAN communication link. Server module 76 includes software that interfaces with the protocols of each online audio service provider to allow online playlists to be downloaded and transferred into database module 68. Thus, playlist structures and playlist titles created online using the web-based content selection guide are available and can be interacted with by the user with the webpad playlist manager GUI application 276 running on wireless webpad 32.

Software Functions—Communication/Message Processing

The communication and control functions of the wireless webpad 32 system will now be described. In one embodiment, a user may use wireless webpad 32 GUIs to control the function of wireless webpad 32 and other client devices connected to the system.

For example, the user makes selections on webpad playlist manager GUI application 276 using the stylus with the touch screen LCD 136. These interactions are processed by the microprocessor 115 and operating system in PDA 36, and messages are sent to control firmware 96 in wireless LAN adapter 40 via the serial port interface. These messages are then converted into XML-based messages and sent via HTTP requests to system control application 64 on PC via wireless LAN. These messages are interpreted by server module 76 running on PC and specific actions are initiated. Applications enabled by the wireless webpad 32 system are discussed below.

System Function—Local Browsing

System control application 64 includes server module 76 that operates as a server for webpad 32. A database of information can be maintained on PC such as yellow pages directories, white pages directories, TV Guide, and the like. Database module 68 stores the locations of the local content files. Because of the speed of LAN, access to this information is very fast. In this embodiment PDA 36 GUI is a browser that accesses the server with HTTP requests.

System Function—Internet 8 Browsing

Server module 76 also acts as a router and network address translator, allowing the user to use the browser application on the PDA 36 to access web pages on Internet 8. The browser application on PDA 36 can receive world wide web URLs entered by the user, and server module 76 will route these requests through to the wide area connection, such as a broadband Internet 8 connection. The responses back from Internet 8 are routed through to webpad 32.

System Function—Streaming Audio

An aspect of control firmware 96 on wireless LAN adapter 40 in combination with webpad playlist manager GUI application 276 on the PDA 36 provides the ability to initiate and control a real-time digital audio or video stream from server module 76 on PC. Webpad playlist manager GUI application 276 on PDA 36 also provides the standard controls for starting, stopping, pausing, progressing to the next track, and the like. These controls are GUI elements on the touch screen LCD 136. The user activates the control GUI elements with the stylus.

The interaction of control firmware 96 with server module 76 provides a buffer management function that controls the flow of portions of the digital audio file from PC into a local DRAM memory of wireless webpad 32. The buffer management function insures that the local DRAM memory buffer is filled as the contents of DRAM are decoded by microprocessor 115 executing CODEC 100. DAC converts the decoded digital audio into analog signals that are presented at the head phone jack 128 on wireless LAN adapter 40. The user listens to the audio stream using a stereo headset plugged into earphone jack 128.

System Function—Real-Time Interactive TV Synchronization Mode

There are two embodiments for providing interactivity between webpad 32 and a TV. In one embodiment, the system control application 64 is run on PC. In another embodiment, the system control application 64 can run on a set-top box that includes a digital cable converter and a DOCSIS cable modem, as well as a wireless LAN access point.

Figure 7:
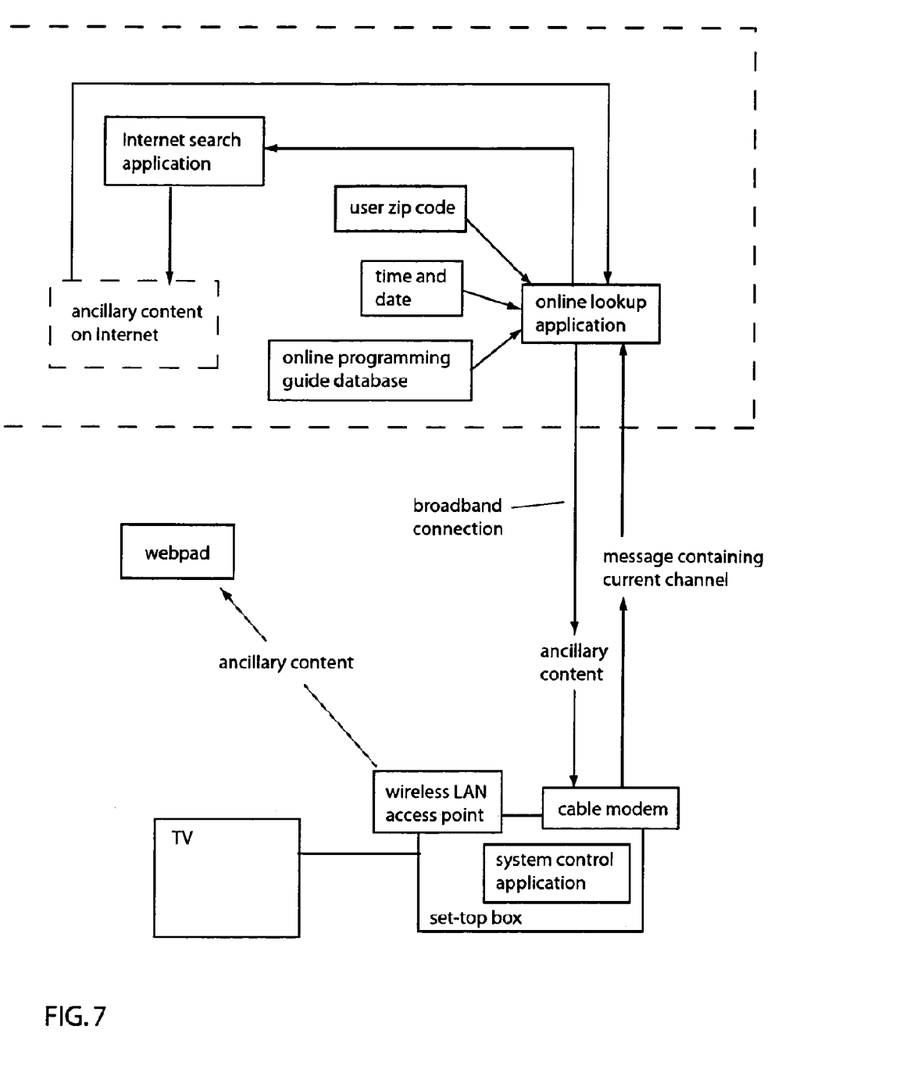
FIG. 7 is a block diagram of one embodiment of an interactive TV system using a set-top box.

In the set-top box scenario, as shown in FIG. 7, system control application 64 receives information as to the current cable channel that the digital cable converter is tuned to. The set-top box makes the currently playing content channel available to system control application 64. System control application 64 sends a message containing the current channel via Internet 8 connection integral to the set-top box to an online lookup application.

In one embodiment, the online lookup application in combination with an online programming guide database, a function for obtaining the current time and date, and location information regarding the user, such as zip code, obtains a text description of the currently playing content. The online programming guide database is a searchable database of the broadcast programming schedule for all broadcast mediums, such as terrestrial, cable, and satellite broadcasts. The user has an online account with the service/set-top box provider so that zip code information is accessible.

In an alternate embodiment, an Internet 8 search function is used to gather ancillary content links, defined as links to webpages that relate in subject matter to the text descriptors of the currently playing content. These ancillary content links are automatically sent to webpad 32 when TV synchronization mode is activated on webpad 32. The result is that while watching a TV program such as movie or an advertisement, related links are immediately sent to webpad 32.

Using the above example of ancillary content sent automatically to the webpad 32, activation by the user of a GUI tag button displayed on webpad 32 LCD 136 that is associated with the ancillary content currently displayed on LCD 136, results in the transmission of a message back through LAN informing system control application 64 that tag button was activated. Server module 76 then compiles and transmits tag message to a tag storage and processing server. The information in tag message is associated with the currently playing content and may include but is not limited to: metadata or meta-tags (ID3 data) included in the file or stream (characters or images); the file name if content is a file; the URL or IP address of the stream if content is a stream; time; date; and user identifier. Other ancillary content is then aggregated a web page that is accessible to the user of the system.

In another embodiment, the system control application is operating on a PC. There are two methods for providing the current channel data to the system control application for the purpose of sending ancillary content links to webpad 32.

Figure 8:
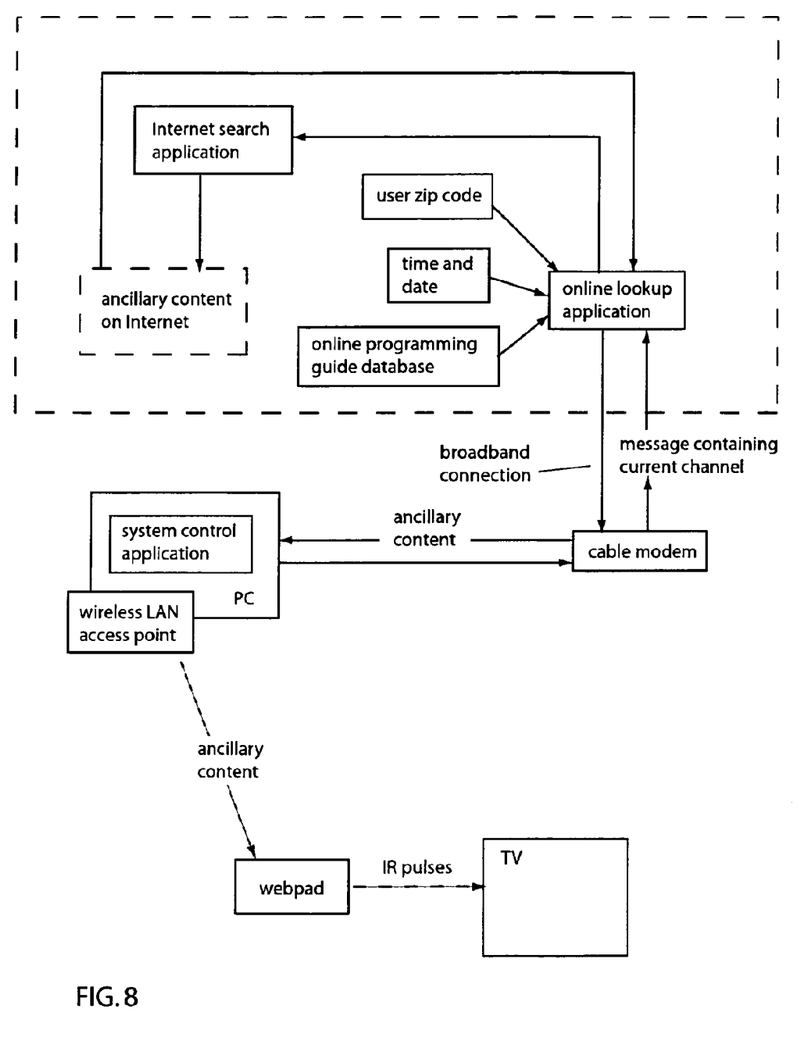
FIG. 8 is a block diagram of one embodiment of an interactive TV system using a PC.

Referring now to FIG. 8, webpad 32 includes an IR transceiver subsystem and is used to control the broadcast media channel on the TV. This is accomplished by the use of control firmware, a TV control GUI, and the associated IR pulse codes for the given TV.

Figure 9:
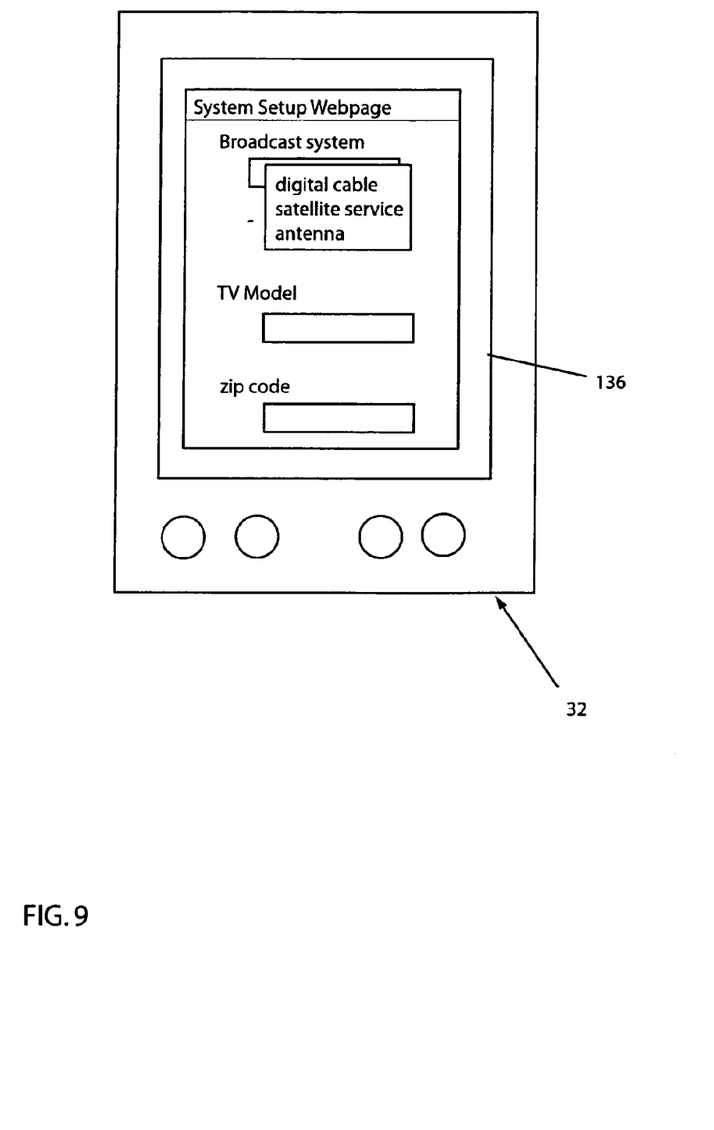
FIG. 9 is a view of one embodiment of a graphical user interface on a webpad.

FIG. 9 shows a broadcast media system setup webpage that is accessed via webpad 32, that enables the user to provide information regarding the model of cable-ready TV that is being used, as well the broadcast system that is being used, and the user's zip code. The system control application uses the model number of the cable-ready TV to obtain the pulse code for changing the cable channels on the TV from a pulse code database on the Internet 8. The IR pulse codes for controlling the cable-ready TV are automatically downloaded into webpad 32. The broadcast system and zip code are used by the online lookup application to derive the programming schedule for the system.

Referring again to FIG. 8, when the user uses webpad 32 to change a channel, control firmware that is controlling the TV control GUI sends a message to PC with the current channel. In the initial setup of the TV control GUI, the actual channel number must be input by the user. System control application on TV in turn sends this information to the online lookup application, which operates as described above. The ancillary content webpage link is sent back through the system until it is pushed onto webpad 32 and automatically refreshed so that the user has immediate access to the ancillary content.

In an alternative embodiment, the other method in which the system control application can access the current channel data to be sent to the online lookup application is for the user to input the cable channel or actual name of the TV program into a webpage GUI on webpad 32.

There are many applications that can operate using the elements and sequence of events described above. For example, users can engage in real-time interactive games, such as playing along with game show programs. In the case of interactive games, rather than ancillary content being sent back to webpad, pages are sent to webpad that are synchronized with a game that is being played. The pages contain questions that are the same questions as those being presented on the game show program. Webpad 32 users can answer the questions using the webpad 32 user interface and send the answers back to the game show program synchronizing server.

Another embodiment of the real-time interactive TV mode is the ability to bid on TV auctions. In this embodiment, an auction can be broadcast via terrestrial cable or TV and users can respond using webpad 32. The items to be bid upon are sent formatted as webpages to webpad 32. Using a GUI, users input amounts to be paid into the GUI and trigger the response to be sent back to the auction server on Internet 8.

In another embodiment, the interaction involves placing bets on various gambling activities including card games, horse races, and sporting events. Users use a GUI in a browser on webpad 32 to input amounts of bets. These bets are processed by a bet-processing server and the outcome of the game is sent back to webpad 32.

In another embodiment, the interaction involves purchasing products or services by the use of a GUI on a webpage on webpad 32. Webpages that are synchronized to the broadcast content are presented that include links or buttons for purchasing the product. If the user activates the "purchase" button, a message is sent back through the system to an e-commerce server and the user is notified that the purchase has been made.

System Function—Voice-Over-IP Mode

In one embodiment, wireless LAN adapter 40 includes DSP for digitizing audio inputs. A headset, which is a combination earphone and microphone, is plugged into headset jack 184 on wireless LAN adapter 40. When a voice-over-IP call is initiated using a GUI on PDA 36, DSP in concert with microprocessor 115 and control firmware 96 converts the analog voice signal into digital packets in real time and sends this information via LAN communication link to server module 76 on PC. Server module 76 on PC routes these packets to the appropriate voice-over-IP server on Internet 8. It is assumed that Internet 8 voice-over-IP service is used. FIG. 3 shows that wireless LAN adapter 40 includes an answer button 288 that is connected electrically to microprocessor 115 and allows convenient one-button activation when answering voice-over-IP calls. Volume up and volume down buttons are also included in wireless LAN adapter 40.

System Function—Voice-Recording Mode

In one embodiment, DSP and microprocessor 115 constitutes a audio digitizing subsystem that can be used to digitize voice messages. A GUI on PDA 36 allows the user to initiate and stop a recording interval, similar to controls on many audio recording devices. As the recording is taking place, the audio signal is digitized and sent in large blocks that are re-constructed by system control application 64. The resulting audio files are stored on PC, or can be sent other users as email attachments. The GUI on PDA 36 also includes an address book for selection the recipient of the audio message.

System Function—Image Data Transfer

Image data transfer occurs in two modes: still camera function and video camera function. In one embodiment, the wireless LAN adapter 40 includes a CCD chip and lens subsystem. The output of a CCD ship is a single frame or a sequence of frames that are an array of pixels. In still image transfer mode, one digital frame is sent to PC via wireless LAN communication link 48 and stored in database 68. This digital image can be saved in a variety of standard image formats such as JPEG or TIFF formats. A GUI on PDA 36 provides for activation of the still image camera function.

In video camera mode, digital video frames are captured by the CCD subsystem and encoded in MPEG-4 format, and sent in real time via the wireless LAN communication link, to system control application 64. A video compilation software application that is an element of system control application 64 appends these frames into an MPEG-4 video file. In an alternative embodiment, the MPEG-4 stream can be routed by the server module 76 to a server on the Internet 8 where the stream can be accessed by a third party. A GUI on PDA 36 allows for the starting and stopping of streaming video from wireless webpad 32.

Network Device Control

In one embodiment, by connecting a network module to various other electronic devices, these devices become nodes in the LAN and can be manipulated by software on PC as well as with GUI control applications running on webpad 32. Examples of other networked devices could include, but are not limited to, a television, stereo, oven, HVAC system, lights, video camera security systems, video baby monitors, and door locks, among others. LAN adapters connected to electronic devices differ according to the functions of each device but include a wired or wireless transceiver and other necessary control circuitry.

PC with wireless LAN access point 28 and system control application 64 is the fixed central controller for all these devices and can be used to perform various control functions such as on/off control. Webpad 32 is used as the portable central controller for these networked devices. In an example scenario, a user can use webpad 32 in concert with a wireless LAN video module that is pointed to an infant located in a house.

As another example, webpad 32 can be used to control a digital audio converter, a device that is a node on the LAN and is able to receive digital audio streams from PC, decode and convert the stream into analog signals that are plugged into any existing stereo system. Webpad playlist manager GUI application 276 that is used to manage playlists and control streams into webpad 32 can be used to control audio content delivered to the digital audio converter. A GUI element in webpad playlist manager GUI application 276 allows the user to select either digital audio converter or webpad 32 as the target device for the audio stream.

In one embodiment, a further use of webpad 32 as a device controller entails using the built in infrared (IR) capabilities on PDA 36s. Webpad 32 can use its IR transmitter to communicate directly with electronic devices with IR receivers such as televisions and stereos, or with an IR enabled amplifier module attached. The specific IR configurations for individual electronic devices can be downloaded from Internet 8 by PC, stored on PC and then sent to webpad 32.

In an example scenario, webpad 32 is used to control the television. The user requests to use PDA 36 as a TV remote controller by making a selection to his effect on a GUI on webpad 32. The makes selections on the AV control GUI on webpad 32 both to lower the volume of the TV and to watch a specific program being broadcast. Previously, webpad 32 downloaded the relevant IR configurations for the TV from Internet 8 through PC. Webpad 32 then transmits the IR data to the TV.

Alternative Embodiments

The wireless LAN adapter has several permutations that have not yet been explicitly mentioned but are implied: the module can include an external antenna 122; the audio in/out jack and/or the stereo out jack and its associated function can be regarded as optional on the device; the CCD and its associated functions can be viewed as optional on the device; the IR capabilities and its associated functions on the PDA can be viewed as optional on the PDA; the IR capabilities and its associated functions can be incorporated directly into the wireless LAN adapter; the CCD and its related functions can be added to the system by attaching a CCD camera plug-on adapter module directly to the PDA (PDAs such as the Palm Pilot, manufactured by Palm Computing, and the Visor, manufactured by Handspring, offer optional CCD camera plug-on adapters); the wireless LAN adapter may include a conventional power jack and be recharged through a charging module unassociated with the PDA. Other permutations and embodiments exist that are not explicitly listed above.

Embodiment with PDA with Decoding Capability

PDAs such as the iPaq include microprocessors that are capable of decoding digital audio and video streams, as well the capability to store a quantity of digital content files in internal memory. In another embodiment, an iPaq includes a CompactFlash wireless LAN card and an integrated control and GUI software application that provides the capability of communicating with the system control application as well as all of the functions of the webpad described above.

Embodiment with Gateway Node

For example, another method for providing an Internet connection to the webpad is to include a gateway node, a device that is a wireless LAN to ethernet converter. The gateway node system is used when there is an existing Internet connection such as a DSL connection or a cable modem connection. An example system would include a broadband gateway that is also a hub, such as the Netopia 3100 router, made by Netopia. The Netopia router performs routing and hub functions in addition to other functions such as being a DHCP server (it dynamically serves up internet protocol addresses). The Netopia router has several physical connection ports. In one port it receives a connection to the Internet, such as a DSL connection. There are several other physical ports that are Ethernet ports. The gateway node in this case would convert Ethernet protocol to the wireless LAN protocol, and broadcast them. The gateway node would alternatively receive RF signals from the webpad module and convert them to Ethernet protocol messages. By using a gateway node, the webpad assembly is capable of communicating with the Internet without the use of a home PC.

Depending on which PDA is used and how much computing power is available, various functions described above may be executed by the processor located in the wireless LAN adapter, or they may be executed by the processor in the PDA. Or both processors may share the computing load.

Alternative Embodiment

Wireless Connection to Streaming Player with Storage

In another embodiment, wireless LAN adapter includes a large quantity of battery-backed up static RAM, or SRAM that allows the webpad to store a quantity of data. For example, the user selects a number of digital audio tracks on the PC using the GUI on the wireless webpad that are to be downloaded and stored on the webpad. The battery backed-up SRAM stores the files so the user can access and listen to the digital audio files away from the wireless LAN communication link.

In another embodiment, the wireless LAN adapter may include a card slot for accepting CompactFlash memory cards. In this case, the digital audio files transferred from the PC to the wireless webpad are stored in CompactFlash memory, and the user may listen to the audio files beyond the vicinity of the LAN communication link.

A webpad and method for using the same have been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. A method comprising:
receiving data at an adapter module of a portable electronic device and from a computer system via wireless transmission; and
rendering the data on the portable electronic device during a time period in which primary streamed content is being rendered on an audiovisual device, wherein the primary streamed content being rendered on the audiovisual device is received from the computer system, wherein the data includes an ancillary content link related to the primary streamed content, and wherein the audiovisual device is different from the portable electronic device.

2. The method of claim 1, wherein the data is obtained from a location using an application on the computer system.

3. The method of claim 2, wherein the data is obtained from the Internet.

4. The method of claim 2, wherein the location is a database on the computer system.

5. The method of claim 1, further comprising receiving instructions via a user interface on the portable electronic device as to what content is to be streamed from the computer system.

6. The method of claim 1, further comprising manipulating an electronic device from the portable electronic device via wireless transmission, wherein the electronic device includes at least one of a television, a stereo, an oven, a light, a video camera security device, a video baby monitor, and a door lock device.

7. A method of transferring ancillary data, the method comprising:
determining, at a computer system, information about primary streamed content being rendered on an audiovisual device;
sending, from the computer system, the primary streamed content to the audiovisual device;
obtaining, at the computer system, ancillary data relating to the primary streamed content based on the information; and
automatically sending the ancillary data from the computer system to a portable electronic device for access therefrom as the primary streamed content is being rendered on the audiovisual device, wherein the ancillary data includes an ancillary content link related to the primary streamed content, and wherein the audiovisual device is different from the portable electronic device.

8. The method of claim 7, wherein the audiovisual device comprises a television, and wherein the computer system comprises a set top box.

9. The method of claim 8, wherein determining information about the primary streamed content being rendered on the television using the set top box includes determining what channel the television is rendering using a first application on the set top box.

10. The method of claim 7, wherein determining information about the primary streamed content being rendered on the audiovisual device further comprises:
receiving the information on a user interface of the portable electronic device; and
sending the information to a first application on the computer system.

11. The method of claim 7, wherein obtaining the ancillary data relating to the primary streamed content based on the information comprises looking up the ancillary data using an application on the computer system, wherein the application comprises an online lookup application.

12. The method of claim 7, wherein the ancillary content link comprises a link to a webpage related to the primary streamed content.

13. The method of claim 7, wherein the ancillary data includes a text description of the primary streamed content being rendered on the audiovisual device.

14. A system comprising:
a local area network (LAN);
a portable electronic device coupled to the LAN and including an adapter module attached to a personal digital assistant; and
a computer system coupled to the LAN, wherein the computer system is configured to stream data to the adapter module via a wireless transmission, wherein the computer system includes a system control application configured to determine information about primary streamed content being rendered on an audiovisual device, wherein the computer system is configured to send the primary streamed content to the audiovisual device, wherein the audiovisual device is different from the portable electronic device, and wherein the computer system is further configured to send to the portable electronic device an ancillary content link related to the primary streamed content.

15. The system of claim 14, wherein the computer system includes an online lookup application configured to obtain ancillary data relating to the primary streamed content based on the information about the primary streamed content, and wherein the ancillary data includes the ancillary content link.

16. The system of claim 14, wherein the computer system is further configured to send additional ancillary data to the portable electronic device, wherein the additional ancillary data includes a text description of the primary streamed content being rendered on the audiovisual device.

17. The system of claim 14, wherein the audiovisual device comprises at least one of a television, an audio converter device, or a stereo.

18. The system of claim 14, wherein the portable electronic device comprises a user interface configured to receive instructions from a user as to what data is to be streamed from the computer system and what ancillary data is to be sent to the portable electronic device.

19. A computer-readable storage device having instructions stored thereon, the instructions comprising:
 instructions to receive data at an adapter module of a portable electronic device and from a computer system via wireless transmission; and
 instructions to render the data on the portable electronic device during a time period in which primary streamed content is being rendered on an audiovisual device, wherein the primary streamed content being rendered on the audiovisual device is received from the computer system, wherein the data includes an ancillary content link related to the primary streamed content being rendered on an audiovisual device, and wherein the audiovisual device is different from the portable electronic device.

20. The computer-readable storage device of claim 19, wherein the data is obtained from a location using an application on the computer system.

21. The computer-readable storage device of claim 19, further comprising instructions to receive a command via a user interface on the portable electronic device as to what data is to be streamed from the computer system.

22. A computer-readable storage device having instructions stored thereon, the instructions comprising:
 instructions to determine information about primary streamed content being rendered on an audiovisual device;
 instructions to send the primary streamed content to the audiovisual device;
 instructions to obtain ancillary data relating to the primary streamed content based on the information; and
 instructions to automatically send the ancillary data to a portable electronic device for access therefrom as the primary streamed content is being rendered on the audiovisual device, wherein the ancillary data includes an ancillary content link related to the primary streamed content, and wherein the audiovisual device is different from the portable electronic device.

23. The computer-readable storage device of claim 22, wherein the audiovisual device comprises a television, and wherein the non-transitory computer-readable medium is located within a set top box, and wherein the non-transitory computer-readable medium further comprises instructions to determine what channel the television is rendering using a first application on the set top box.

24. The computer-readable storage device of claim 22, wherein the instructions to determine information about the primary streamed content being rendered on the audiovisual device further comprises:
 instructions to receive the information on a user interface of the portable electronic device; and
 instructions to send the information to a first application on the computer system.

25. The method of claim 1, further comprising transmitting, by the portable electronic device, a selection of the ancillary content link, wherein the selection of the ancillary content link represents a real-time reaction to the primary streamed content.

26. The method of claim 25, wherein the primary streamed content is a real-time interactive game show, and wherein the real-time reaction is an answer to a question on the real-time interactive game show.

27. The method of claim 25, wherein the primary streamed content is an auction program, and wherein the real-time reaction is a bid to purchase something on the auction program.

28. The method of claim 25, wherein the primary streamed content is an event or game, and wherein the real-time reaction is a bet relating to a potential outcome of the event or game.

29. The method of claim 1, further comprising transmitting, by the portable electronic device, a selection of the ancillary content link, wherein the selection of the ancillary content link represents a tag message, and wherein the tag message comprises a word or words associated with the primary streamed content.

* * * * *